US000001332H

United States Statutory Invention Registration [19]

[11] Reg. Number: H1332

[43] Published: Jul. 5, 1994

Deakyne et al.

[54] THERMAL CONDUCTIVE MATERIAL

[75] Inventors: Clifford K. Deakyne, Wilmington, Del.; John G. Lavin, Swarthmore, Pa.

[73] Assignee: E. I. Du Pont de Nemours and Company, Wilmington, Del.

[21] Appl. No.: 827,142

[22] Filed: Jan. 27, 1992

Related U.S. Application Data

[63] Continuation-in-part of Ser. No. 570,308, Aug. 20, 1990, abandoned, which is a continuation-in-part of Ser. No. 251,783, Oct. 3, 1988, abandoned.

[51] Int. Cl.[5] ..... B32B 27/00

[52] U.S. Cl. ..... 428/290; 428/408; 428/902; 428/421; 428/422

[58] Field of Search ..... 428/286, 297, 298, 302, 428/323, 408; 264/29.2; 524/424, 495, 496

[56] References Cited

U.S. PATENT DOCUMENTS

| | | | |
|---|---|---|---|
| 4,005,183 | 1/1977 | Singer | 423/447.2 |
| 4,265,968 | 5/1981 | Prewo | 428/336 |
| 4,356,228 | 10/1982 | Kobayashi et al. | 428/283 |
| 4,395,362 | 7/1983 | Satoh et al. | 252/511 |
| 4,604,413 | 8/1986 | Nabeta et al. | 523/137 |
| 4,632,798 | 12/1986 | Eickman et al. | 264/272.17 |
| 4,776,994 | 10/1988 | Nelson et al. | 264/29.2 |
| 4,861,653 | 8/1989 | Parrish | 428/288 |
| 4,871,491 | 10/1989 | McMahon et al. | 264/29.2 |
| 5,026,748 | 7/1991 | Adams et al. | 524/66 |

FOREIGN PATENT DOCUMENTS

| | | |
|---|---|---|
| 0069492 | 1/1983 | European Pat. Off. . |
| 0168639 | 1/1986 | European Pat. Off. . |
| 754321 | 1/1971 | France . |
| 2256633 | 3/1986 | Japan . |

*Primary Examiner*—Robert L. Stoll
*Assistant Examiner*—Joseph D. Anthony

[57] ABSTRACT

A three-dimensional arrangement of carbon fibers made from mesophase pitch are used to reinforce polymer resins to form a composite material. The composite material exhibits high thermal conductivity values on all axes through the composite.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THERMAL CONDUCTIVE MATERIAL

This is a continuation-in-part of U.S. Ser. No. 07/570,308 filed Aug. 20, 1990, now abandoned which in turn is a continuation-in-part application of U.S. Ser. No. 07/251,783 filed Oct. 3, 1988 and now abandoned.

BACKGROUND OF THE INVENTION

This invention relates to thermally conductive material and, more particularly, it relates to a carbon fiber reinforced resin matrix for use as a strong, structurally stable thermal conductive material.

The market segment for electrical devices such as for windings of motors, transformers and solenoids is increasingly moving to miniaturization of such devices. This in turn leads to a rise in internal equipment operating temperature resulting in not only a need for higher temperature ratings on insulation materials used for these applications, but also a need for materials with improved thermal conductivity properties.

It is known to attempt to improve thermal conductivity by adding many kinds of filler as disclosed in "Thermally Conductive Polymer Compositions", D. M. Bigg, Polymer Composites, June 1986, Vol. 7, No. 3, pp. 125–140. The fillers include spherical particles of various metals, glass or carbon black, non-spherical metal or ceramic particles and aluminum fibers. Bigg teaches that the thermal conductivity of the composite is largely determined by the resin and that in the case of fibers, the most important variables influencing composite conductivity are fiber volume fraction and fiber 1/d in the actual composite.

SUMMARY OF THE INVENTION

With the recognition that fiber orientation is a key determinant of thermal conductivity in a composite material, a composite material has been developed to complement the move toward miniaturization of electrical devices which exhibits high strength, structural stability and has improved thermal conductivity capability. More particularly, if a laminate is made with continuous fibers all oriented in the same direction (a "unidirectional" laminate), the thermal conductivity along the fiber axis will be determined by the "rule of mixtures". That is, it will be equal to the area of fiber times the fiber conductivity plus the area of resin times the resin conductivity. The thermal conductivity along the axis perpendicular to the fibers, however, will be dominated by the resin, and will typically be a small multiple of the resin conductivity. The case of discontinuous fibers is more complex; however, it may generally be said that the thermal conductivity of a laminate along any axis is strongly dependent upon the fraction of fibers oriented in the direction of that axis. In any practical application, the most important axis will be the one with the lowest thermal conductivity, since this will limit the flow of heat in the part. Thus, in the case of planar samples, the limiting thermal conductivity will be through-the-plane.

This material comprises 10 to 70% by weight carbon fiber and preferably about 15 to about 60% by weight carbon fiber, the balance being made up of a resin. Preferably the ratio of the thermal conductivity of the composite ($K_c$) to the thermal conductivity of the resin ($K_p$) is above 10. The carbon fibers are preferably made from a mesophase pitch by the process described in U.S. Pat. No. 4,861,653 which is incorporated by reference. The fibers are in a three-dimensional arrangement, each fiber has a lamellar microstructure, and there is a distribution of diameters among the fibers ranging from about 1 micrometer to more than 10 micrometers and a number average less than 8 micrometers. The fibers also are heat treated in an inert atmosphere to a temperature above 1600° C., more preferably above 2400° C.

Suitable resinous materials which may be used as the resin include, but are not limited to, commercially available thermoplastic and thermosetting resins. Suitable processes for making useful parts include, but are not limited to, injection molding, compression molding, melt casting and blow molding.

Surprisingly, the fibers described above may be incorporated into composite material at much higher volume fractions than fibers described in the prior art. Also, surprisingly, the thermal conductivity in the critical through-the-plane test is above about 10 (BTU)-(in)/(ft$^2$)(hr)(°F.) as measured on the axis of lowest thermal conductivity for the composite material or articles formed from the material. The thermal conductivity performance of these articles is attributed to maintaining the three-dimensional arrangement of the fibers during forming so that at least a fraction of the fibers are oriented in any one of the axes through article.

DETAILED DESCRIPTION OF THE PREFERRED EMBODIMENT

Figure 1:
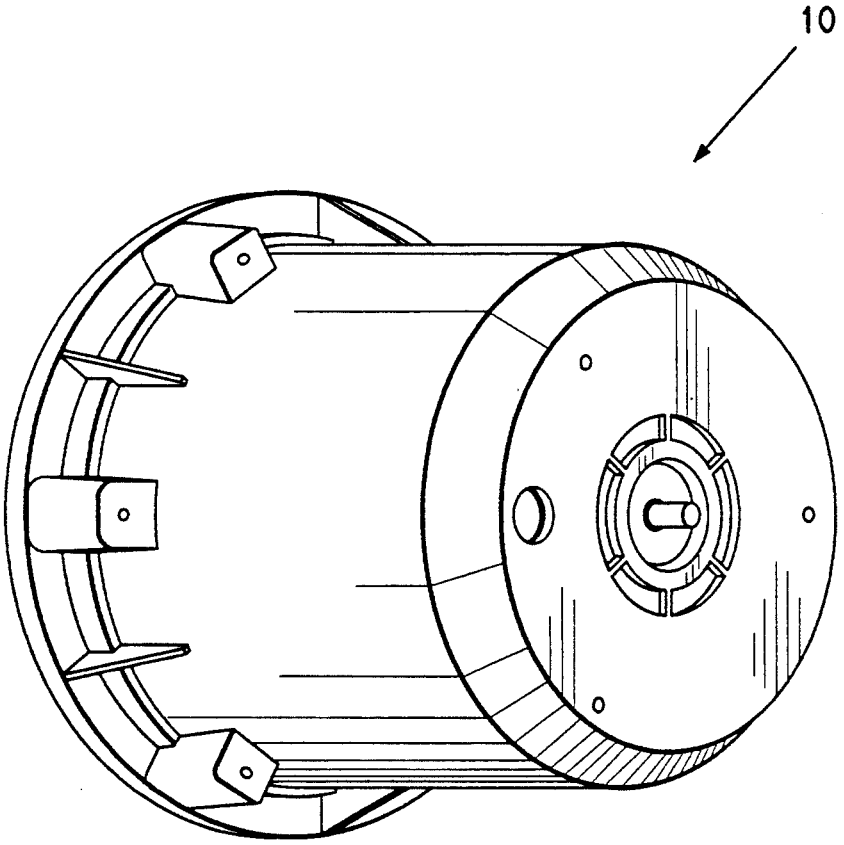
FIG. 1 is a composite article formed from the material of this invention.

Referring now to FIG. 1, the component structure 10 is an injection molded motor housing made from resin reinforced with a three dimensional arrangement of mesophase pitch based discontinuous carbon fibers.

Figure 2:
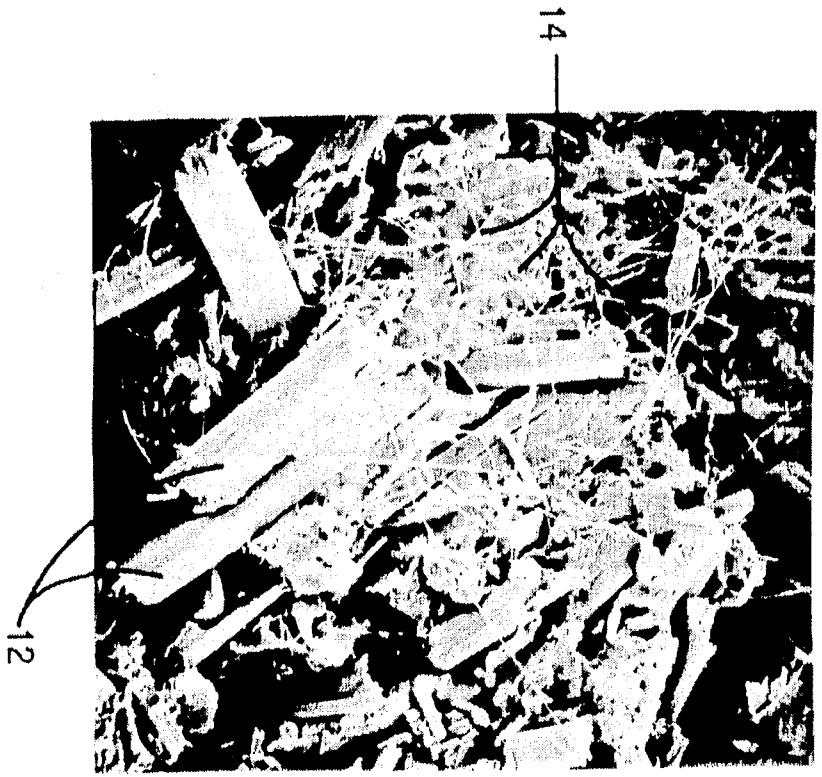
FIG. 2 is a photomicrograph of the material of this invention.

In FIG. 2 a structure is displayed showing a resin filled with a three-dimensional fiber structure with fibers of varying lengths and dimensions. More particularly, FIG. 2 is a photograph taken on a Scanning Electron Microscope at 1000× magnification. It is a view of the fracture surface of a tensile test bar. The bar was cut from an injection molded plaque made from the material of this invention. The resin is principally polyethylene terephthalate (PET). In the photograph, the fibers 12 are seen in a three-dimensional arrangement as cylindrical or elliptical rods of varying size. The fine threads 14 are polymer. It will be observed that the fibers are oriented in many directions; indeed, they appear to be oriented quite randomly so that at least a fraction on the fibers are oriented in any one of the axes through the structure.

One way the composite material is made is by feeding the resin and a carbon fiber batt made according to the disclosure in above-noted patent into a single screw extruder and extruding the composite material as a strand which is then chopped and collected. The chopped strand is then used in various molding processes to form articles having high thermal conductivity. Another way to form the composite material of this invention is by grinding a planar laminate into small pieces and recompressing them or forcing a very high viscosity molten resin perpendicular to the plane of a fiber assembly and moving some fibers into the third dimension.

Thermal conductivity (T.C.) is measured in accordance with ASTM Standard F-433 with a Dynatech C-Matic instrument, model TCHM-DV, and is designated as (BTU)(in)/(ft$^2$)(hr)(°F.).

The composite material exhibits a three dimensional arrangement of fibers within the resin matrix as estimated from percent shrinkage data in the x, y, and z coordinate axes directions from mold size to the final part. More particularly, essentially equal percent shrinkage of the final part in the x, y, and z directions indicates three dimensional isotropic fiber reinforcement while percent shrinkage of the final part that varies by several orders of magnitude between directions suggests highly oriented reinforcing fibers.

EXAMPLE I

A multiple six layer sandwich consisting of alternate layers of 5-mil thick Du Pont Teflon TM PFA fluorocarbon polymer film and mesophased based graphite fiber mat, made according to the procedure described in U.S. Pat. No. 4,861,653, was formed into a 7"×7" mold of a standard compression molding machine. This multilayer sandwich was cold compressed in order to fit the fiber and film into the cavity for one minute at 1 ton, 2 ton and 2.5 ton pressures. The mold was then put into a hot press at 740° F. and the mass consolidated according to the following schedule:

5 min contact pressure
5 min 1.25 ton pressure
20 min 12.5 ton pressure then cooled at 1.25 ton pressure.

Good consolidation was not accomplished because of the high viscosity of the PFA resin and the distance it was required to travel through the mat. The laminate was then repressed to improve consolidation by reinserting into the mold and heating to 740° F. and pressing to 37.5 tons for 20 minutes, then cooling at 1.25 tons. The volume fraction of the fiber in the composite is about 40%. A section of a laminate, made according to the above procedure, was tested according to ASTM F-433 for thermal conductivity at 50° C. and shown to be about 14 (BTU)(in)/(ft$^2$)(hr)(°F.) versus about 1.3 for the matrix as measured through the thickness, i.e., on the axis of lowest thermal conductivity for the laminate.

EXAMPLE II

A sample was made by compression molding a granulated molding compound. The molding compound was made by interleaving equal weights of a FR-PET film (Rynite TM FR by Du Pont) (3.5 mil) and a pitch based carbon fiber mat heat-treated at 2600° C. at about 220 g/m$^2$ with a total of about 15 plies of mat. This stack was vacuum bagged between plates and consolidated by heating to 570° F. under contact pressure, only then applying 500 psi at temperature for 10 minutes, then cooling under pressure. The plate was then ground into particles using an I.M.S. model 3144-SP granulator machine with a ⅜" screen. A 6"×6" mold was filled with 120 g of predried granules with essentially random orientation. The mold was heated to 590° F. under contact pressure for 20 minutes, then 350 psi was applied for 10 minutes, then cooled under pressure. Thermal conductivity was measured according to ASTM F-433 on the axis of lowest thermal conductivity of the sample. This yielded a thermal conductivity of 47.6 (BTU)(in)/(ft$^2$)(hr)(°F.) at 50° C. and 63.2 (BTU)(in)/(ft$^2$)(hr)( F) at 150° C.

The same granulated material was also injection molded using an "8 oz. Van Dooran" lab injection molder. A "gentle" screw design was used to maintain fiber length. A mold with 3"×5" plaques was used and subsequently 2" diameter disc was cut and thermal conductivity was measured according to ASTM F-433 on the axis of lowest thermal conductivity of the disc. This yielded a thermal conductivity as 22.4 (BTU)(in)/(ft$^2$)(hr)(°F.).

The same fiber and resin were compounded using a 2" single screw with vacuum. This unit is normally used to compound glass. The screw is not as "gentle" as that used for injection molding. Strands were extruded and then chopped replacing the granulated material above. This material was then injection molded as described above and tested for thermal conductivity as described above, giving a value of 21.1 (BTU)(in)/(ft$^2$)(hr)(°F.).

EXAMPLE III

Injection molded plaques were made from the formulation used in Du Pont's Rynite TM resins with glass, polyacrylonitrile-based carbon fiber (PAN) and ultra-high modulus pitch-based carbon fiber (UHM) representing the ultimate in high conductivity carbon fibers. Methods of blending the fiber with the resin varied. The Rynite TM resin with glass was a commercial formulation. The Rynite ® resin with PAN fiber was produced by feeding resin into a rear port of an extruder, the PAN fiber into a vacuum port, blending in the extruder, being forced out through an orifice as a small diameter rod and chopped into pellets. The UHM fibers were too brittle to process in a conventional sense. They were cut into ½" lengths and blended with polymer pellets in the feed hopper of an extruder, fed through and chopped into pellets. Plaques 3"×5"×0.125" were made from the fiber/polymer mixtures and samples were cut from these to measure thermal conductivity at 50° C. according to ASTM Standard F-433 on the axis of lowest thermal conductivity.

The results are summarized below:

| | Thermal Conductivity (BTU)(in)/(ft$^2$)(hr)(°F.) |
|---|---|
| PET/PAN | 2.3 |
| PET/Glass | 2.3 |
| PET/UHM Carbon | 3.5 |

EXAMPLE IV

Three laminates were prepared according to Example 2, U.S. Pat. No. 4,861,653 in the following manner:

The weight of fiber needed for the desired volume % loading was cut from the carbon fiber batts using a 7"×7" square template. The fiber was placed on a tray inside a vacuum oven at 70 degrees Centigrade and 28" Hg and left overnight to remove residual moisture. The following morning 100 grams of Hercules 3501-6 epoxy resin was placed in each of two aluminum pans, and to each pan was added 10 grams of Araldite RD-2 reactive diluent, which serves to reduce the viscosity of the epoxy resin, and to allow it to flow better within the fiber assembly. This mixture was then degassed and dried in the vacuum oven along with the fiber. Care was taken to maintain the vacuum below 12" Hg to avoid foaming of the resin. Periodically the resin uniform viscosity. The resin was heated for about 2 hours.

The apparatus used to make the plaque was a "picture frame" stainless steel mold with a cavity 7"×7", which was 1½" deep. The frame was placed in a "vacuum can", which had previously been sprayed with Frecote 33 mold release. The vacuum can was lined with a fiberglass cloth to absorb the resin squeezed from the mold during consolidation. A bottom plate, ½" thick was placed in the frame. A Kapton ® release film which has been sprayed with Frecote 33 mold release was placed on top of the bottom plate. Next the fiber and epoxy were added. In order to make a plaque 0.1" thick, 7 to 12 pieces of batt each about ¼" thick may be required, because of the low volume density of the batt. A layer of fiber was placed in the frame, and a small quantity of resin poured around the edges of the fiber sheet, and also criss-cross on the fiber surface. This step was repeated until all the fiber was in the mold. Then a release film of Kapton ® which had been sprayed with Frecote 33 mold release was placed on top of the fiber, and a 7"×7"×1" thick ram plate placed on top of the fiber. Shims were placed on top of the mold so that when the ram plate was squeezed down to their level the plaque would be of the desired thickness. Finally, "tacky tape" was placed along the flanged perimeter of the vacuum can to create a vacuum seal, and a large piece of Kapton ® film placed over the vacuum can and pressed into the tacky tape to seal. The film was held in place with Bulldog clips.

The assembly was placed in a hydraulic press for curing. A vacuum connection was made to the vacuum can, and the vacuum maintained at 10 to 12" Hg. The cure cycle was as follows: the assembly was heated to 70° C. and held for one hour, to allow the epoxy to soften and distribute within the fiber; it was next heated to 112° C. and held for an hour; next, the ram plate was pressed down to the shims—this was done slowly to avoid forcing out too much epoxy, and done in press-release cycles to move air bubbles from the center to the edge of the mold, where they could be removed by vacuum; when the ram plate was pressed to the shims the temperature was raised to 124° C., and it was held for 18 hours—once it had reached the desired temperature the vacuum was turned-off; the assembly was then cooled to ambient temperature under pressure.

A 2" diameter disk was cut from each of three laminates and identified as sample A, B and C and thermal conductivity measured in accordance with ASTM standard F-433 at about 50° C. on the axis of lowest thermal conductivity of each disc. The compositional and thermal conductivity data of the samples is summarized below:

| Sample Ref. | Fiber Vol. % | Temperature Degrees C. | Thermal Conductivity BTU (in)/(ft$^2$) (hr) (°F.) |
|---|---|---|---|
| A | 33.6 | 55.6 | 3.6 |
| B | 35.3 | 55.2 | 4.4 |
| C | 35.8 | 54.6 | 4.9 |

What is claimed is:

1. A thermally conductive composite material comprising a resin reinforced with a three-dimensional arrangement of discontinuous mesophase pitch based carbon fibers said material having a thermal conductivity above about 10(BTU) (in)/(ft$^2$) (hr) (°F.) as measured on the axis of lowest thermal conductivity through the material.

2. The thermally conductive material as defined in claim 1 wherein said resin is polyethylene terephthalate polymer.

3. The thermally conductive material of claim 1 wherein said resin is fluorocarbon polymer.

4. A component made from the material of claim 1.

* * * * *